United States Patent
Hamm

[15] 3,654,950
[45] Apr. 11, 1972

[54] VALVE

[72] Inventor: John R. Hamm, Mentor, Ohio

[73] Assignee: Borg-Warner Corporation, Chicago, Ill.

[22] Filed: Apr. 20, 1970

[21] Appl. No.: 29,815

[52] U.S. Cl..............................137/219, 251/172, 251/333, 285/112, 277/152
[51] Int. Cl.........................................F16k 1/06, F16k 1/12
[58] Field of Search............137/219, 220, 221, 222, 516.29; 251/DIG. 3, 172, 333, 334; 277/152; 285/112

[56] References Cited

UNITED STATES PATENTS

| | | | |
|---|---|---|---|
| 1,947,071 | 2/1934 | Walton | 251/172 |
| 2,725,891 | 12/1955 | De Bourguignon et al. | 137/219 |
| 2,269,671 | 1/1942 | Kinzie | 137/219 |

FOREIGN PATENTS OR APPLICATIONS 372,048  5/1932  Great Britain......................137/219

*Primary Examiner*—Henry T. Klinksiek
*Attorney*—Donald W. Banner, William S. McCurry and John W. Butcher

[57] ABSTRACT

An axial sleeve valve movable by a toggle mechanism between open and closed positions with respect to an interchangeable shroud cooperates with a pressure energized valve seat carried by the shroud to close the valve for the passage of fluid. The sleeve valve is moved to be slightly spaced from or to barely contact the valve seat which is flexed by the pressure differential created essentially by the position of the sleeve valve, i.e., is pressure energized, to perfect the seal with the sleeve valve. An operating mechanism permits quick operation of the valve and also limits the movement of the sleeve valve when the sleeve valve is moved to its closed position.

3 Claims, 7 Drawing Figures

INVENTOR
JOHN R. HAMM
BY Aubrey L. Burgen
ATTORNEY

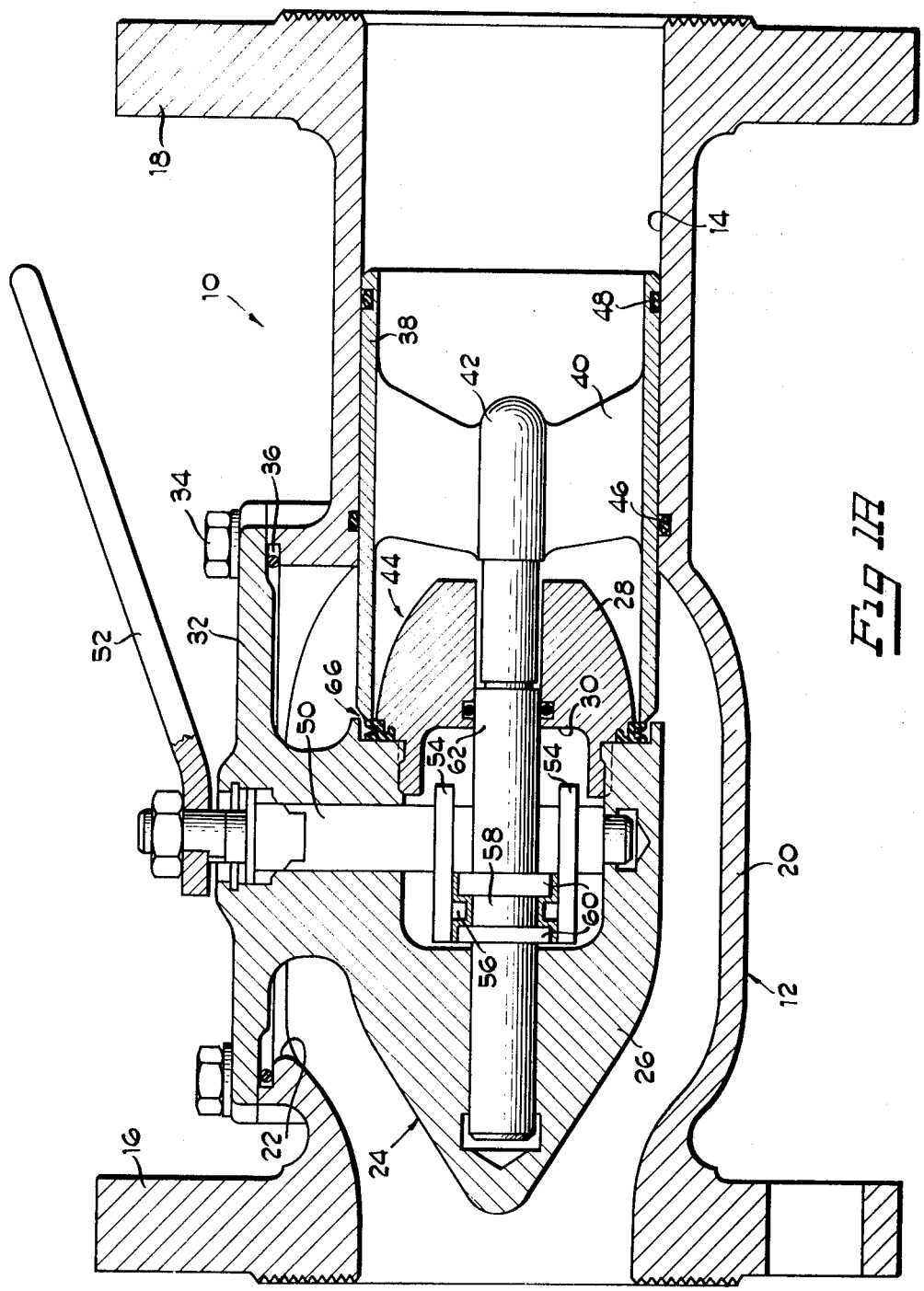

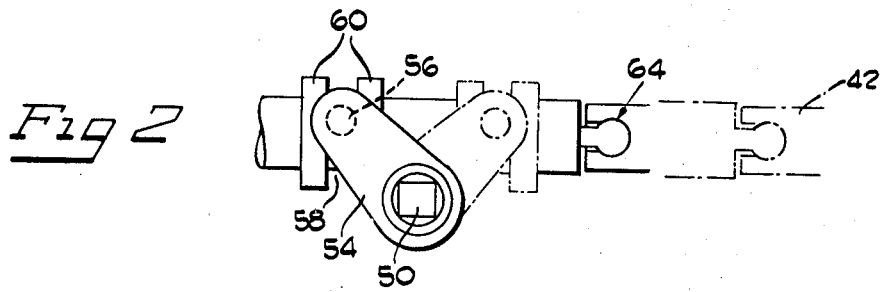
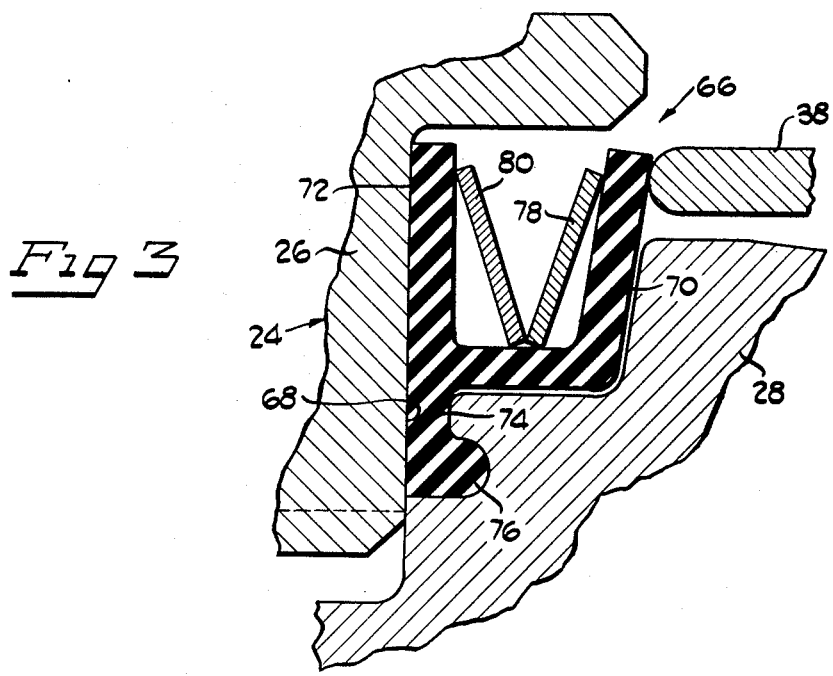
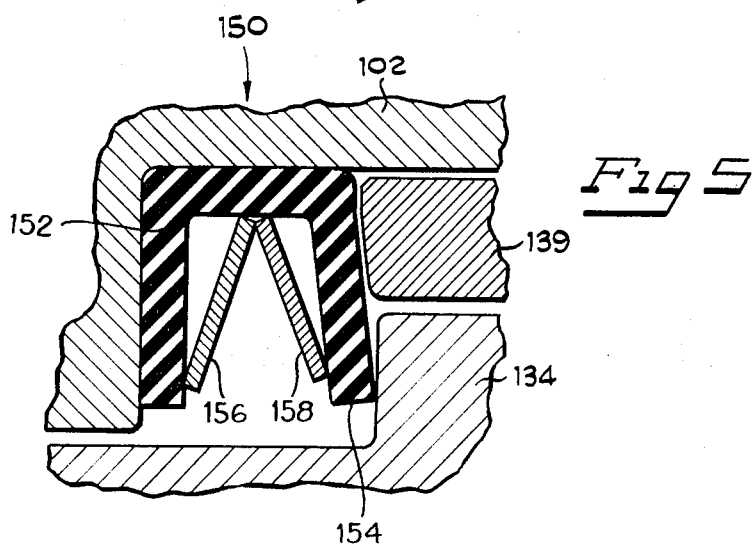

INVENTOR
JOHN R. HAMM
BY *Aubrey L. Burgess*
ATTORNEY

VALVE

BACKGROUND OF THE INVENTION

Valves including an axial movable sleeve valve which, together with a shroud, control the flow of fluid through a conduit are well known in the art. In the usual valve of this type, the sleeve valve must be moved into tight engagement with a sealing ring or the like to stop the flow of fluid through the conduit. As the seal member becomes compacted, through age and use, the sleeve valve must be moved a greater distance to its closed position. And, after a period of time, the seal member becomes ineffective and must be replaced.

THE INVENTION

According to this invention, which includes an axially movable sleeve valve and a shroud to control the flow of fluid in a valve structure, a pressure energized seal is used for stopping the flow therethrough. In addition, there is an operating mechanism for axially moving the sleeve valve quickly between its various positions. The operating mechanism is of such construction to limit the position of the sleeve valve member in its closed position.

The pressure energized seal is flexed by a fluid pressure differential established on the opposed surfaces thereof into sealing engagement with the sleeve valve in its closed position blocking flow of fluid through the valve. The pressure energized seal is flexed into sealing engagement with the sleeve valve by the fluid pressure differential on the opposite sides thereof which is established by the sleeve valve when it is moved to its closed position just barely contacting the seal member or slightly spaced therefrom. The operating mechanism can be a toggle mechanism or an electric motor operated device, as will be described in detail herein.

THE DRAWINGS

FIG. 1A is a view similar to FIG. 1 with the valve in closed position;

FIG. 3 is an enlarged sectional view of a pressure energized seal as incorporated in the structure of FIG. 1;

FIG. 5 is a view similar to FIG. 3 of another embodiment of the seal means.

THE PREFERRED EMBODIMENTS

Figure 1:
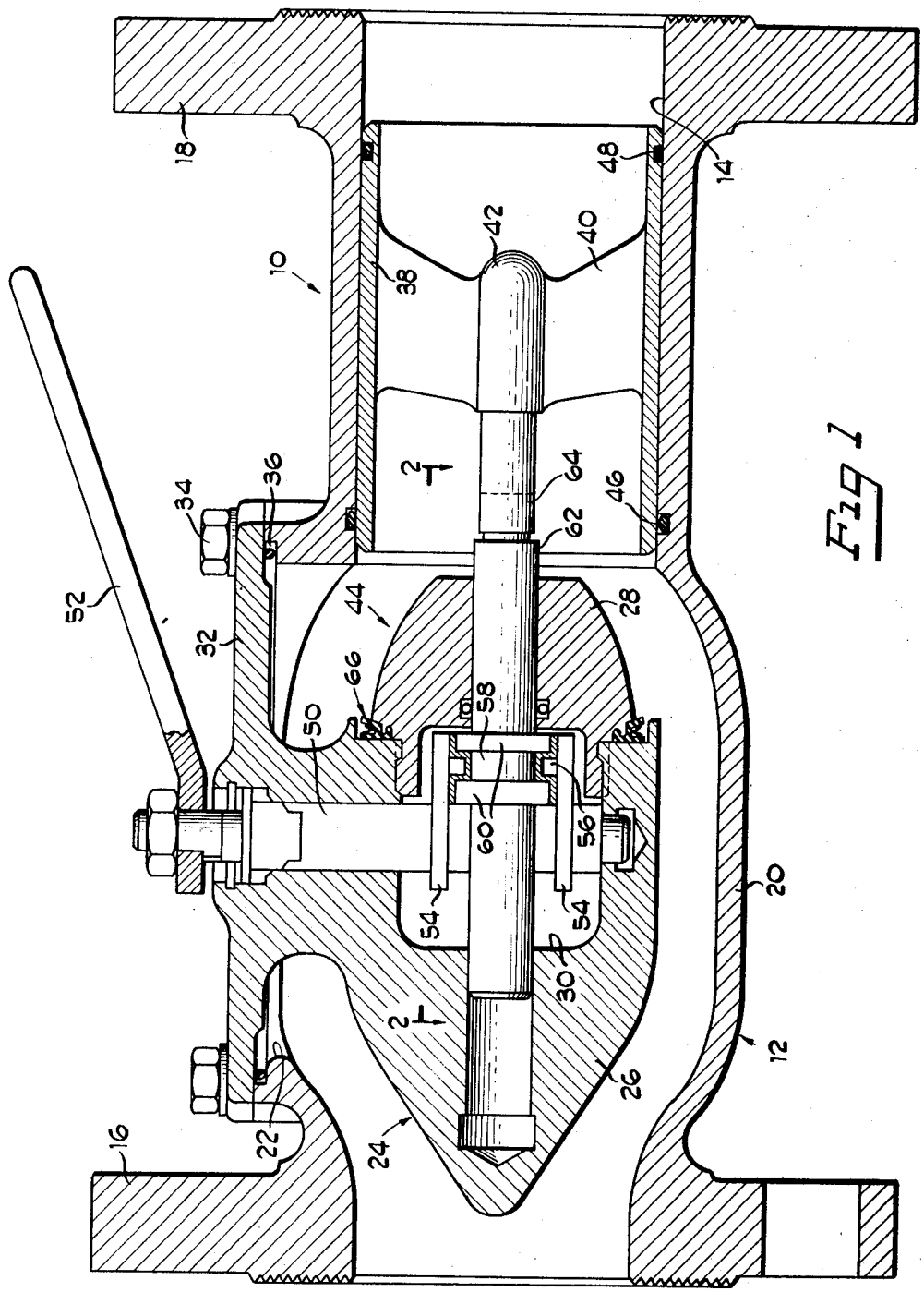
FIG. 1 is a cross-sectional view taken centrally through a valve constructed according to this invention when in open position.

FIG. 1 shows a valve generally identified as 10 which includes a body 12 having a central bore 14 for the flow therethrough of fluid and flanges 16, 18 for connection to flanges (not shown) of other pipes or the like (also not shown). The body 12 is provided with an enlarged portion 20 having a flanged opening 22 therein through which a shroud 24 and other operating mechanism, to be described, can be inserted and removed. The shroud 24 is constructed of multiple parts 26, 28 which when assembled as shown, define a cavity 30. A cover 32 for the opening 22 is integral with the part 26 although it could be a separate part if desired. Bolts 34 connect the cover 32 to the valve body 12 and also position the shroud 24 in the body 12. To provide a fluid tight seal between the cover 32 and the housing 12 an O-ring seal 36 is provided.

An axial movable sleeve valve 38 having radial ribs 40 is integral with a central member 42 which is positioned in the bore 14 and is movable therein between open and closed positions, as is illustrated respectively in FIGS. 1 and 1A, by means of a toggle mechanism 44. An 0-ring seal 46 in a groove in the body 12 and an 0-ring seal 48 in a groove in the sleeve valve member 38 eliminate fluid flow between the sleeve valve 38 and the bore 14.

The toggle mechanism 44 includes a rotatable shaft 50 having a handle 52 connected thereto for rotating the shaft 90 degrees about it's axis. The shaft 50 is journaled for rotation in the shroud portion 26 and has connected thereto spaced arms 54 each of which has a depending dog 56 for engaging slots 58 formed by spaced collars 60 on an axially movable shaft 62. The shaft 62 is joined to the member 42 of the sleeve 38 by a key-holed shaped connection 64 which permits easy removal and reengagement of parts through the opening 22 when it is desired to change the shroud 24 or the shape thereof. The shaft 50 is offset from the axis of the shaft 62 as is illustrated in FIG. 2 of the drawing. The operating arms 54 and the depending dogs 56 are located in the cavity 30 of the shroud 24. From an inspection of FIG. 2 of the drawings, it can be seen that a quarter turn of the handle 52 moves the sleeve valve 38 between it's open and closed positions (which are illustrated in FIGS. 1 and 1A respectively).

A seal 66 (see especially FIG. 3) is received in an annular groove 68 formed by the juncture of shroud parts 26, 28. The seal 66 is basically U-shaped in section with spaced arms 70 and 72, and a portion extending from the arm 72 with an enlarged bead portion 76 received in a complementary shaped portion of the groove 68. This structure securely locks the seal 66 in its desired position. Between the legs 70, 72 are disc springs 78, 80 for preloading the seal. The seal 66 is constructed of a material which is capable of flexing, such as "TEFLON" or the like.

In operation and when its desired to stop the flow of fluid through the valve 10, the handle 52 is turned to move the sleeve valve 38 to its closed position closed adjacent the seal 66. This effectively prevents the major portion of the fluid from flowing through the valve and establishes a differential pressure between one side of the valve and the other side of the valve, which differential pressure acts on the seal 66 to slightly flex the leg 70 toward the sleeve valve 38 and completely eliminate fluid flow through the valve. Thus the seal 66 can be described as a pressure energized seal.

Figure 4:
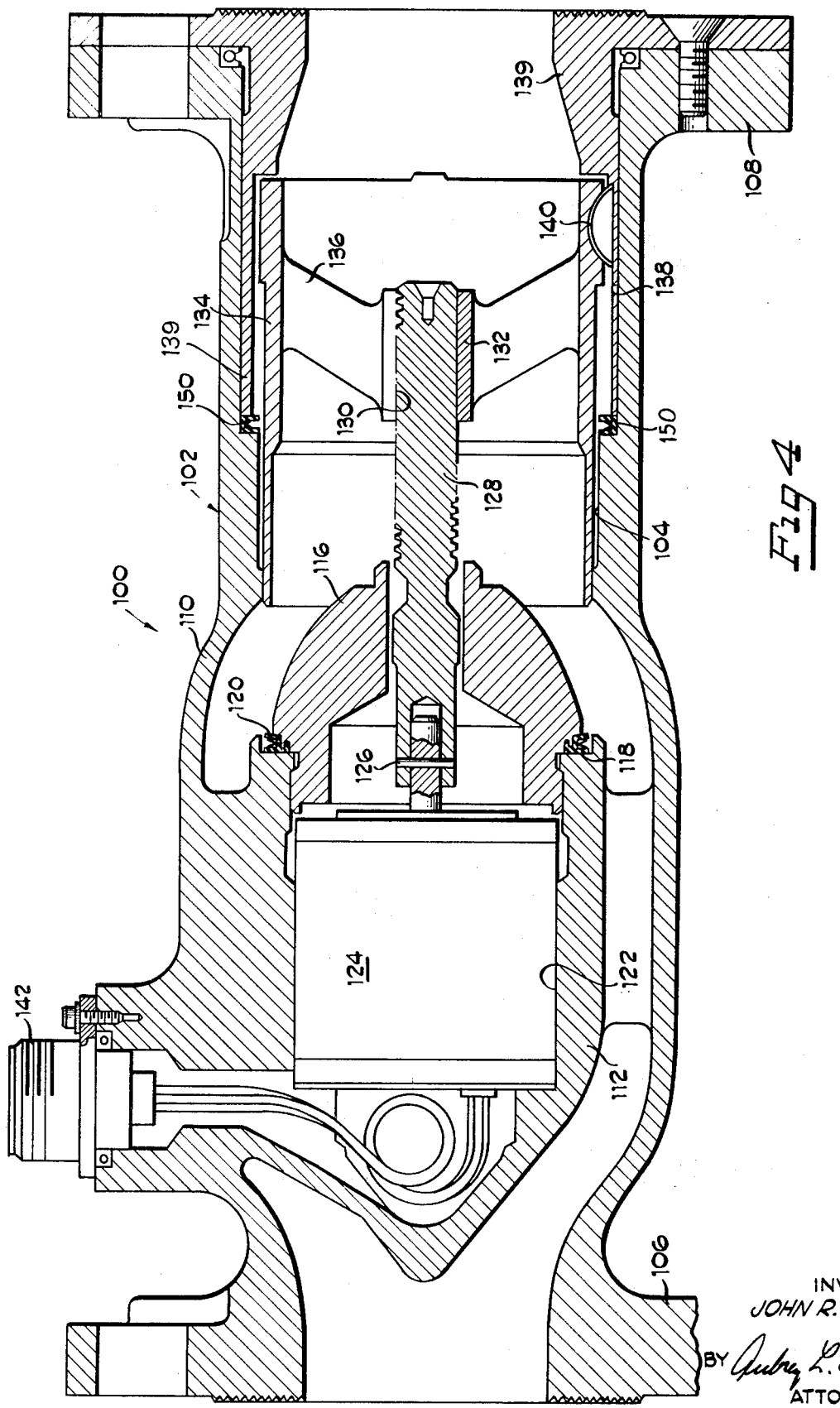
FIG. 4 is a cross-sectional view similar to FIG. 1 of another embodiment of the invention when the valve is in open position.
Figure 4A:
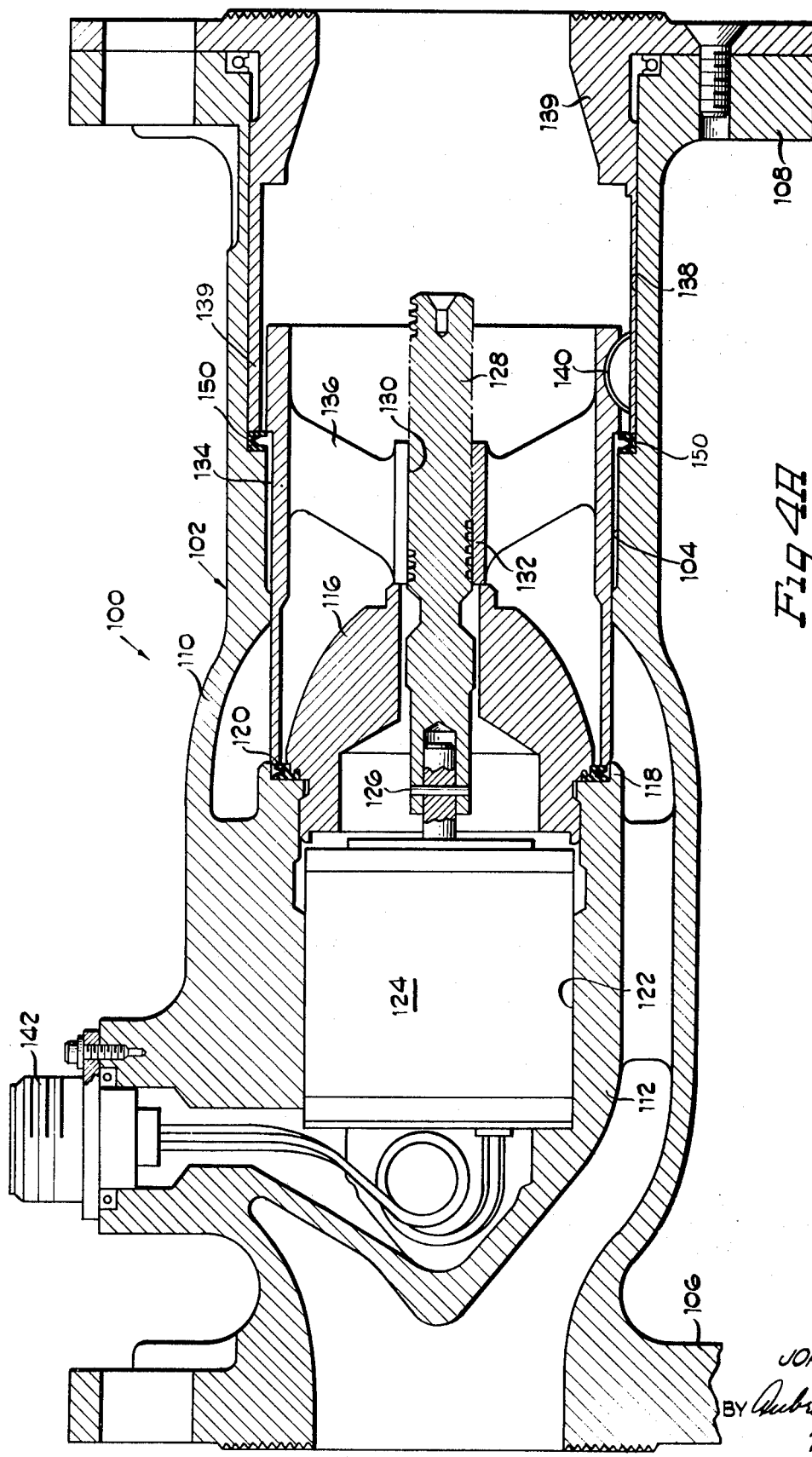
FIG. 4A is a view similar to FIG. 4 showing the valve in closed position.

Attention is now directed to FIGS. 4 and 4A showing another embodiment of the invention. The embodiment incorporates the same pressure energized seal as in the FIGS. 1 and 1A embodiment, the difference being in the mechanism for axially moving the sleeve valve between its open and closed positions.

Here the valve is generally identified as 100 and includes a body 102 with a central bore 104 and end flanges 106, 108 for connection to suitable piping for use. The body 102 has an enlarged portion 110 in which a portion 112 of a shroud 114 is integrally formed. The other portion 116 of the shroud is separately formed and is joined to the portion 112. A groove 118 formed at the juncture of the shroud parts receives the seal 120 which, as previously stated is identical in construction to the seal 66 of the FIG. 1 embodiment. The shroud parts 112 and 116 define a cavity 122 which receives an electric motor 124 to which is connected, by a pin 126, a screw-thread shaft 128. The shaft 128 is received in a thread bore 130 of an axially movable sleeve valve 134 slidable in the valve bore 104. The sleeve valve 134 has webs 136 connecting the various parts as is illustrated. Key ways 138 in the end piece 139 and keys 140 in the sleeve valve 134 are provided to insure axial movement of the sleeve valve without rotation. As will be understood when the axial sleeve valve 134 is moved to its closed position the operation of the mechanism is identical to that previously described. To move the sleeve valve 134, the electric motor is energized by any suitable controls, and through a connector, generally identified as 142. The motor rotates the shaft 128 to move the sleeve valve 134 between its positions.

Attention is now directed to FIG. 5 of the drawings which illustrates another embodiment of the seal member similar in construction to that identified as 66 in the FIG. 1 description and 120 in the FIG. 4 embodiment. This seal member is identified as 150 and held in the valve body 102 by the end piece 139. The seal member 150 is substantially U-shaped in section with legs 152, 154 and springs 156, 158 and is operated to prevent leakage between the body 102 and the sleeve valve 134 when the valve is in its closed position.

It can be readily understood that the seal member of this invention can be constructed of a substantially washer-like member arranged such that a fluid pressure differential can be established on the opposed sides thereof such to flex the member into engagement with the sleeve valve. If necessary, one or more preloading springs may be used.

What is claimed is:

1. A valve for controlling the flow of pressurized fluid from an inlet to an outlet by adjusting a movable metallic valve member relative to a fixed metallic valve member, comprising: a flexible seal-seat attached and sealed to said fixed valve member and flexed in response to the presence of a fluid pressure differential on a pair of opposed surfaces of said seal-seat;

and means for moving said movable valve member between full-flow and no-flow positions, said movable valve member, when actuated to its no-flow position, being slightly spaced apart from both said seal-seat and said fixed valve member and the inlet fluid pressure being effectively applied to one of said surfaces of said seal-seat, a fluid pressure differential being produced on said opposed surfaces, in response to actuation of said movable valve member to its no-flow position, and effecting flexing of said seal-seat to the extent that it engages and seals to said movable valve member thereby completely and positively cutting off fluid flow through said valve without requiring any compression of said seal-seat or metal-to-metal contact between said fixed and movable valve members.

2. A flow control valve comprising: a housing with a bore therethrough for the passage of pressurized fluid from an inlet to an outlet; a fixed metallic shroud positioned within said bore and permitting fluid flow therearound; a metallic sleeve valve axially movable in said bore between a full-flow position, in which a maximum spacing exists between said sleeve valve and shroud, and a no-flow position wherein said sleeve valve is closely adjacent but slightly spaced apart from said shroud;

a pressure energized annular seal-seat attached and sealed to said shroud and having a generally U-shaped cross-section, one leg of which flexes in an axial direction when a fluid pressure differential is established on the opposite surfaces of that leg, the inlet fluid pressure being effectively applied to both of said opposite surfaces when said sleeve valve is in its full-flow position, while only one of said surfaces is effectively subjected to the inlet fluid pressure when said sleeve valve is in its no-flow position;

and means for moving said sleeve valve between its full-flow and no-flow positions, said sleeve valve, when actuated to its no-flow position, being slightly spaced apart from said seal-seat, a fluid pressure differential being developed on said opposite surfaces of said leg, in response to actuation of said sleeve valve to its no-flow position, to effect flexing of said leg to the extent that it engages and seals to said sleeve valve thereby completely and positively cutting off fluid flow through from said inlet to said outlet without requiring any compression of said seal-seat or metal-to-metal contact between said shroud and sleeve valve.

3. A flow control valve according to claim 2 and including at least one annular disc spring for preloading said seal-seat.

* * * * *